United States Patent [19]

Crum et al.

[11] Patent Number: 5,018,909
[45] Date of Patent: May 28, 1991

[54] POWDER FEED HOPPER

[75] Inventors: Gerald W. Crum, Elyria; Richard D. Burke, Amherst; Robert J. Holland, Avon; Allen Newman, Lorain; David L. Moses, Amherst; William S. Miller, Grafton; Thomas E. Hollstein, Amherst; Jeffrey R. Shutic, Wakeman, all of Ohio

[73] Assignee: Nordson Corporation, Westlake, Ohio

[21] Appl. No.: 508,968

[22] Filed: Apr. 13, 1990

[51] Int. Cl.⁵ .................... B65G 53/38; B65G 53/18
[52] U.S. Cl. .................... 406/138; 406/89; 406/144
[58] Field of Search ............. 406/88, 89, 90, 92, 406/134, 135, 138, 144; 34/10

[56] References Cited

U.S. PATENT DOCUMENTS

| | | | |
|---|---|---|---|
| 2,316,814 | 4/1943 | Schemm | 406/89 |
| 2,799,241 | 7/1957 | Wurster | 111/23 |
| 2,856,273 | 10/1958 | Beber et al. | 422/145 |
| 3,062,414 | 11/1962 | Morris | 406/90 |
| 3,253,750 | 5/1966 | Paton | 406/90 |
| 3,592,395 | 7/1971 | Lockwood et al. | 241/18 |
| 3,659,752 | 5/1972 | Carney, Jr. et al. | 406/90 |
| 3,758,162 | 9/1973 | Holm et al. | 406/85 |
| 3,804,303 | 4/1974 | Fassauer | 406/71 |
| 3,849,900 | 11/1974 | Dale et al. | 34/10 |
| 3,889,388 | 6/1975 | Oguri et al. | 34/10 |
| 3,916,826 | 11/1975 | Knudsen | 118/629 |
| 3,951,099 | 4/1976 | Minckler | 118/694 |
| 4,008,685 | 2/1977 | Pierce | 118/629 |
| 4,051,809 | 10/1977 | Zickar et al. | 118/630 |
| 4,098,222 | 7/1978 | Geary et al. | 118/679 |
| 4,099,485 | 7/1978 | Geary et al. | 118/301 |
| 4,101,685 | 7/1978 | Geary et al. | 427/8 |
| 4,101,687 | 7/1978 | Knudsen | 427/25 |
| 4,117,801 | 10/1978 | Dannelly et al. | 118/20 |
| 4,122,212 | 10/1978 | Walling et al. | 427/27 |
| 4,141,316 | 2/1979 | Grun | 118/303 |
| 4,170,074 | 10/1979 | Heckman et al. | 34/57 A |
| 4,323,312 | 4/1982 | Glatt et al. | 366/102 |
| 4,353,668 | 10/1982 | Anderson | 406/90 |
| 4,459,070 | 7/1984 | Bourgeois | 406/90 |
| 4,535,006 | 8/1985 | Naunapper et al. | 427/213 |
| 4,586,854 | 5/1986 | Newman et al. | 406/153 |
| 4,615,649 | 10/1986 | Sharpless | 406/138 |

Primary Examiner—Joseph F. Peters, Jr.
Assistant Examiner—Virna Lissi Mojica
Attorney, Agent, or Firm—Wood, Herron & Evans

[57] ABSTRACT

A powder feed hopper includes a housing which mounts a porous plate adapted to support particulate powder material and receive an upwardly directed flow of fluidizing air to form an air-entrained fluidized bed in the housing above the porous plate. In order to improve fluidization, a baffle plate is mounted beneath the porous plate in the path of the pressurized air discharged from one or more air nozzles to create a circulating flow of air-entrained particulate powder material within the fluidized bed in which the flow moves upwardly along the wall of the housing and then inwardly and downwardly toward the center of the porous plate. Additionally, stirrer blades are located immediately above the porous plate to create turbulence and reduce the formation of concentrated channels of air atop the porous plate.

29 Claims, 5 Drawing Sheets

POWDER FEED HOPPER

FIELD OF THE INVENTION

This invention relates to powder feed hoppers, and, more particularly, to a powder feed hopper having a fluidized bed which provides air-entrained particulate powder material having substantially uniform density and particle distribution.

BACKGROUND OF THE INVENTION

Powder feed hoppers are commonly employed in electrostatic powder coating systems to supply air-entrained particulate powder material to spray guns located in a powder spray booth which are effective to apply a powder coating to various articles conveyed through the booth. Powder feed hoppers of this type comprise a housing having a hollow interior within which a porous, fluidizing plate is mounted near the bottom end. This porous plate is adapted to support particulate powder material which becomes "fluidized", i.e., entrained in air, by an upward flow of pressurized air through the porous plate. The upward flow of pressurized air forms a fluidized bed or cloud of air-entrained particulate powder material within the interior of the housing which is removed therefrom and transmitted to the powder spray guns by one or more powder pumps associated with the powder feed hopper.

In order to obtain an acceptable coating of particulate powder material on an article to be coated, air-entrained particulate powder material having a uniform density and an evenly mixed particle size distribution must be supplied to the powder spray guns. The term "density" as used herein refers to the relative mixture or ratio of powder-to-air, and the term "particle distribution" refers to the dispersion of powder particles of different sizes within the fluidized bed of the powder feed hopper. A number of problems inherent in the design of many powder feed hoppers have produced non-uniform density and/or uneven powder distribution within the fluidized bed, which, in turn, results in less than desirable coatings on target articles.

One problem with many powder feed hoppers is the development of stable, "chimney"-shaped channels of air within the powder material atop the porous, fluidizing plate. Once these chimneys or cylinders form, the air flow through the porous plate is easier through such chimneys than through the surrounding areas in the plate covered with powder. As a result, fluidization of the powder material carried on the porous plate is reduced or stopped and the air-entrained particulate powder cloud within the fluidized bed above the porous plate becomes substantially non-uniform in density and particle distribution.

Another problem with many powder feed hoppers is the creation of stratification of particles within the fluidized bed. Stratification is obtained by developing an upward flow of pressurized air through the porous plate which is substantially uniform in velocity across the surface area of the plate. Such velocity distribution causes the larger diameter powder particles to collect near the bottom of the fluidized bed, adjacent the porous plate, and progressively smaller diameter particles are concentrated at increasing distances from the porous plate within the fluidized bed. When the air-entrained particulate powder material is withdrawn from a stratified fluidized bed, such stream does not contain a typical distribution of particle sizes, thus producing a poor quality coating on an article to be coated.

Efforts have been made to reduce the formation of channels or cylinders of powder at the porous plate and stratification of particles according to size within the fluidized bed of powder feed hoppers, but solutions such as air distribution channels, manifolds and other constructions have proven to be relatively expensive, difficult to convert from one type of powder material to another and often result in the formation of localized "hot spots" or areas of relatively high air velocity through the porous fluidizing plate. Hot spots are a particular problem because excessive, high velocity air streams carry with them "fines" or small particles having a size of less than about 15 microns which preferably should remain within the hopper. Additionally, these hot spots or areas of high velocity air can create a "boiling" action, i.e., the formation of air bubbles within the particulate powder material, and these bubbles produce localized, non-homogeneous areas of fluidization which result in an unsteady flow of air-entrained particulate powder material to the powder pumps.

SUMMARY OF THE INVENTION

It is therefore among the objectives of this invention to provide a powder feed hopper which contains air-entrained particulate powder material having a uniform density and uniform particle distribution, which avoids the formation of localized areas of high velocity air, which reduces the carry-off of fines from the area of the fluidizing plate and which reduces air consumption.

These objectives are accomplished in a powder feed hopper having an upper housing formed with an outer wall defining a hollow interior, and a lower housing having a fluidizing air chamber or air plenum. A porous, fluidizing plate is mounted at the bottom of the upper housing which is adapted to support particulate powder material. Pressurized air is introduced into the air chamber which is directed upwardly through the porous fluidizing plate to entrain the particulate powder material in air and form a fluidized bed within the upper housing. In order to achieve improved fluidization of the particulate powder material within the fluidized bed, a baffle is mounted beneath the porous plate in the path of pressurized air introduced into the air chamber, and stirrer blades or paddles are located immediately above the porous plate which are rotatable with respect to its upper surface.

This invention is predicated upon the concept of creating turbulence at the upper surface of the porous, fluidizing plate, and within the fluidized bed in the upper housing of the powder feed hopper. The purpose of this turbulence is to obtain a powder distribution within the fluidized bed which is uniform in density, i.e., powder-to-air ratio, and which has an evenly mixed particle size. As a result, a substantially uniform, air-entrained particulate powder stream can be drawn from the fluidized bed of the powder feed hopper herein thus producing an acceptable coating on an object within an associated powder spray booth.

In one aspect of this invention, turbulence within the fluidized bed of the powder feed hopper is obtained by the inclusion of the baffle plate within the air fluidizing or plenum chamber beneath the porous, fluidizing plate. In one presently preferred embodiment, the baffle plate is a substantially flat, rectangular-shaped plate spaced beneath a rectangular, porous fluidizing plate which is connected to the walls of the housing. The baffle plate is located directly in the path of an upward flow of pressurized air which is introduced into the air fluidizing chamber or plenum and is directed toward the porous plate. The baffle plate has width and length dimensions which are less than that of the porous plate and walls of the housing such that a space or gap is formed between the periphery of the baffle plate and the outer walls of the lower housing of the powder feed hopper. In an alternative embodiment, the porous plate and baffle plate are both circular in shape and are adapted for use with a powder feed hopper having a cylindrical-shaped housing wherein an annular gap is formed between the periphery of the baffle plate and wall of the housing.

The baffle plate of either embodiment deflects the upward flow of fluidizing air such that a portion of the air flow is directed through the outer periphery of the porous plate at relatively high velocity, and the remainder of the air flow is directed through the porous plate from its outer periphery toward the center thereof at progressively decreasing velocity. A velocity distribution is therefore created in the area immediately above the porous plate in which the velocity of the fluidizing air is greatest at the outer periphery of the porous plate and then progressively decreases to the center portion of the porous, fluidizing plate.

In the presently preferred embodiment, structure is provided to aid in obtaining a uniform velocity distribution of the fluidizing air in the area above the porous plate. Air nozzles are located in the air chamber or plenum beneath the baffle plate which are mounted on nozzle adjustment structure for adjusting the lateral, vertical and angular position of the air nozzles relative to the bottom surface of the baffle plate. Each air nozzle is connected to an air valve carried within a manifold, and these valves control the air flow to each air nozzle.

In the embodiment of this invention employing a rectangular baffle plate and rectangular porous plate, there are preferably four air nozzles spaced equidistant from the center of the baffle plate. In the embodiment wherein a circular baffle plate and circular porous plate are utilized, it is preferable to employ six air nozzles spaced approximately 60° apart and at the same radial distance from the center of the baffle plate.

The effect of the above-described air velocity distribution above the porous plate, obtained by either embodiment, is to create a circulating flow of air-entrained powder within the fluidized bed in the upper housing in which the air-entrained powder flow moves upwardly along the outer wall of the upper housing and then inwardly and downwardly toward the center of the porous, fluidizing plate. This circulating flow of fluidizing air occurs because of the different densities of air-entrained particulate powder material at the outer periphery of the porous plate compared to the center area thereof. Because the air flow rate, and, hence, velocity is higher at the outer periphery, the density or powder-to-air ratio is less at the outer periphery than at the center portion of the porous plate. As a result, a natural flow of air and powder is created in a direction from the center of the porous plate toward its outer periphery, i.e., from higher to lower density, thus producing a circulating flow within the fluidized bed wherein the air-entrained particulate powder material flows from the outer wall of the upper housing toward the interior thereof.

One advantage of the above-described air velocity distribution is that channeling, or the formation of concentrated columns or cylinders of air atop the porous plate, is substantially eliminated and thus fluidizing is more uniform across the upper surface of the porous plate. Another advantage is that the air-entrained particulate powder material within the fluidized bed is more uniformly intermixed, thus reducing stratification of particulate powder material according to size.

It has also been found that the baffle plate of this invention permits a reduction in the quantity of fluidizing air required to obtain acceptable fluidization of the particulate powder material which reduces operating costs. A reduction in the air flow rate and air flow velocity of the pressurized air through the porous plate is also advantageous because the carry-out of fines from the fluidized bed is substantially eliminated. "Fines" are powder particles less than about 15 microns in diameter which, if not maintained at or near the porous plate, can create problems because of their light weight and size. Fines can pass through the vent from the powder feed hopper into the environment, and also tend to clog the filters in the powder recovery units of associated powder spray booths. By reducing the velocity of the fluidizing air through the porous, fluidizing plate, the carry-off of fines either through the vent or to the powder spray booth is substantially eliminated.

In one presently preferred embodiment of this invention, additional structure is provided for reducing or eliminating the formation of concentrated channels or cylinders of air atop the porous fluidizing plate. In the presently preferred embodiment, one or more stirrer blades or paddles are carried on a shaft extending upwardly from the bottom of the powder feed hopper through the porous fluidizing plate. The shaft is driven by a motor carried in the bottom of the powder feed hopper which is effective to rotate the stirrer blades to create turbulence immediately above the fluidizing plate which prevents or reduces the formation of channels of air thereabove.

The motor and bearings for the shaft which rotates the stirrer blades are substantially isolated from the fluidized bed of the powder feed hopper within the bottom portion of the lower housing of the powder feed hopper. This is advantageous because it allows the entire top or cap of the upper housing of the powder feed hopper to be utilized for mounting powder pumps and air supply lines thereto in an efficient, organized configuration. Moreover, the cap can be easily removed for cleaning or maintenance of the powder pumps and/or interior of the upper housing of the powder feed hopper with the motor and shaft carried at the base of the powder feed hopper.

DESCRIPTION OF THE DRAWINGS

The structure, operation and advantages of the presently preferred embodiment of this invention will become further apparent upon consideration of the following description taken in conjunction with the accompanying Figs., wherein.

DETAILED DESCRIPTION OF THE INVENTION

Figure 1:
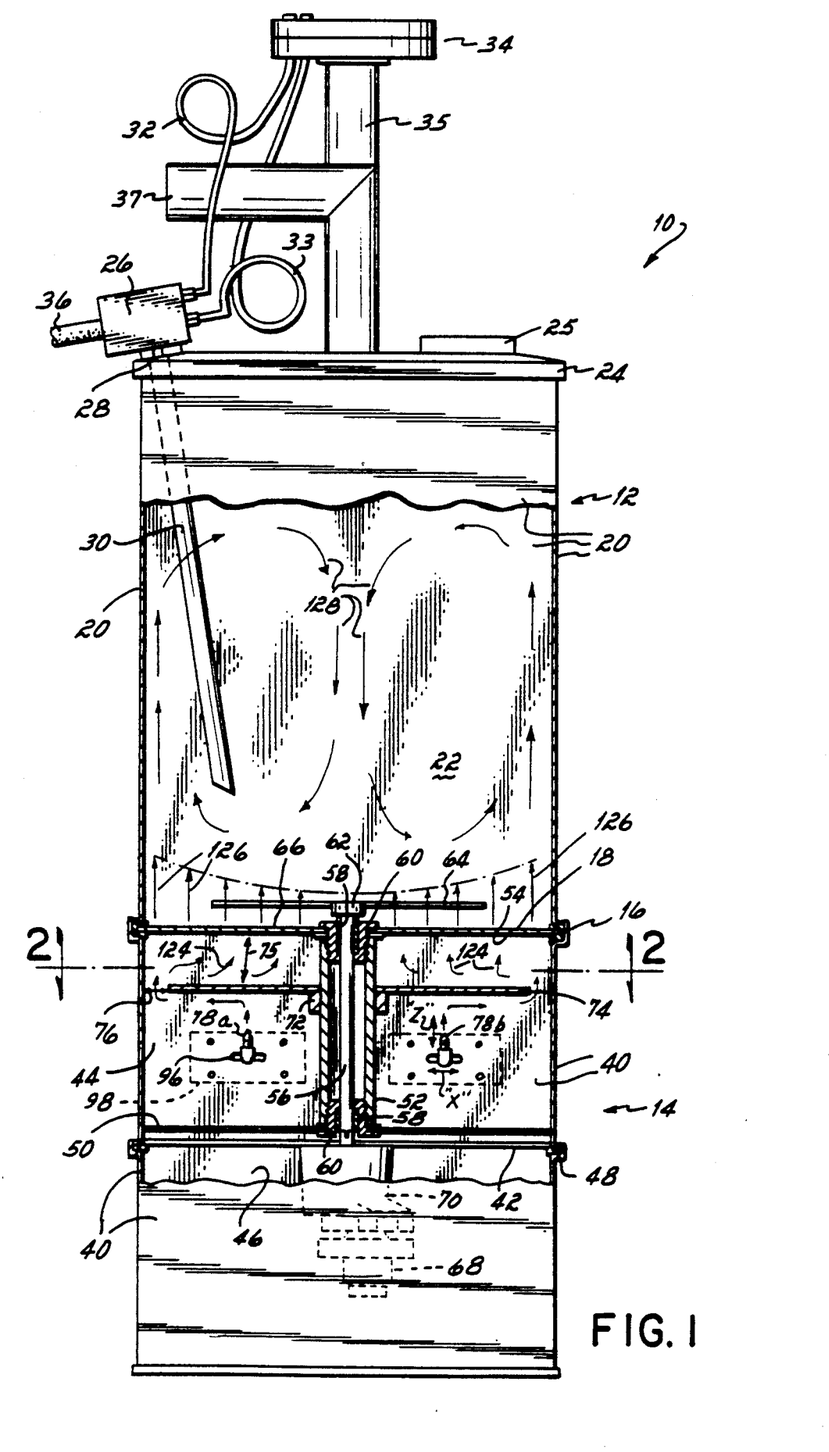
FIG. 1 is a cut-away, schematic elevational view in partial cross section of one embodiment of the powder feed hopper of this invention having rectangular components.
Figure 2:
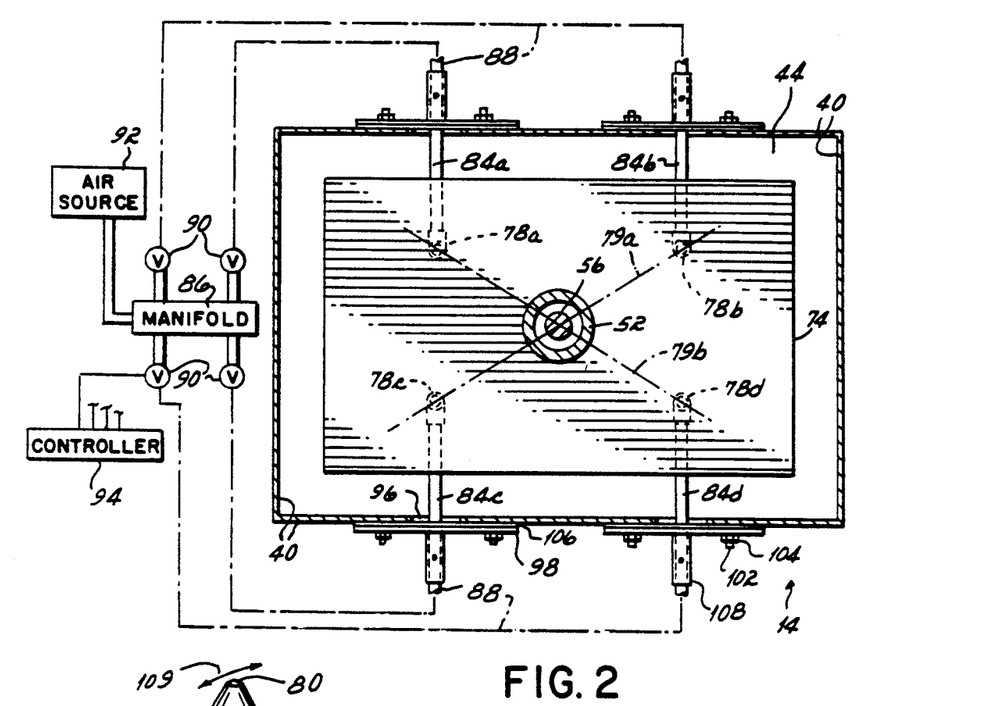
FIG. 2 is a cross sectional view taken generally along line 2—2 of FIG. 1.
Figure 3:
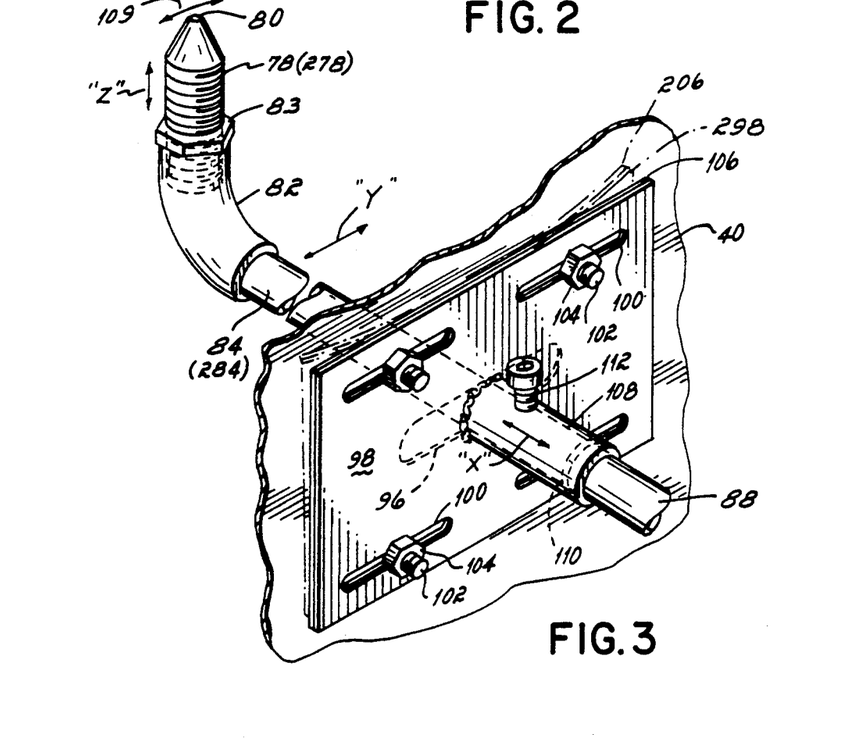
FIG. 3 is a partial side view of the lower housing and air chamber or plenum in which structure for adjusting the position of the air nozzles in the embodiment of FIGS. 1 and 2 is illustrated in solid lines, and structure for adjusting the nozzle position in the embodiment of FIGS. 4 and 5 is illustrated in phantom lines.

Referring now to FIGS. 1-3, one embodiment of a powder feed hopper 10 is illustrated which comprises an upper housing 12 and a lower housing 14. The upper end of the lower housing 14 is formed with a flange 16 which mounts the base of upper housing 12 and supports a porous, fluidizing plate 18.

The upper housing 12 is rectangular in shape having four outer walls 20, two of which are shown in the Fig., forming a hollow interior which defines a fluidized bed 22 above the porous plate 18. The top of upper housing 12 is closed by a cap 24 which sealingly engages the outer walls 20 of upper housing 12. In the presently preferred embodiment, the cap 24 mounts a number of powder pumps 26, one of which is shown in the Fig., each having an inlet 28 connected to a suction tube 30 which extends into the interior of upper housing 12 within the fluidized bed 22. Each powder pump 26 is supplied with pressurized air through air lines 32, 33 connected to a manifold 34 which is supported upon the cap 24 by a vertical post 35. The powder pumps 26 are each effective to withdraw a stream of air-entrained particulate powder material from the fluidized bed 22 and transmit such stream through an outlet line 36 to powder spray guns (not shown). Venting of the interior of the upper housing 12 is provided by a Vent tube 37 mounted to the cap 24. The detailed structure and operation of the powder pump 26 forms no part of this invention per se, and a discussion of same is provided in U.S. Pat. Nos. 4,586,854 and 4,615,649, owned by the assignee of this invention, the disclosures of which are incorporated by reference in their entireties herein.

The lower housing 14 is also rectangular-shaped in the embodiment of FIGS. 1 and 2 having four outer walls 40 which are intersected at about the midpoint thereof by a divider plate 42 to form a fluidizing air chamber or plenum 44 beneath the porous plate 18 and a motor chamber 46 beneath the divider plate 42. Preferably, the divider plate 42 is carried within a seat 48 formed at the intersection of plenum 44 and motor chamber 46.

The outer walls 40 of lower housing 14 also mount a support plate 50 which carries a shaft housing 52 extending between the support plate 50 and the lower surface 54 of porous plate 18. The shaft housing 52 encloses a drive shaft 56 whose top and bottom ends are each rotatably carried in a bearing 58 mounted in bearing housing 60. The top end of drive shaft 56 has a mount 62 which supports one or more stirrer blades or paddles 64 in a position immediately above the upper surface 66 of porous plate 18. The shaft 56 is drivingly connected to an air motor 68 through a speed reducer 70 both of which are carried by the divider plate 42. Upon activation of the air motor 68, the shaft 56 is rotated, which, in turn, rotates the stirrer blades 64 with respect to the upper surface 66 of porous plate 18. This creates turbulence along the upper surface 66 of plate 18 and helps prevent the formation of concentrated channels of air thereabove, as described in more detail below.

A mount 72 is fixedly connected to the exterior of the shaft housing 52 within the plenum 44. This mount 72 supports a flat, rectangular-shaped baffle plate 74 in a position beneath the lower surface 54 of porous plate 18. In the presently preferred embodiment, the baffle plate 74 is located a distance 75 from the lower surface 54 of porous plate 18, and its outer periphery is spaced a distance 76 from the outer walls 40 of lower housing 14.

The baffle plate 74 is located directly in the path of a flow of pressurized air which is introduced into the plenum 44 beneath the baffle plate 74. Referring to FIGS. 2 and 3, pressurized air is directed at the bottom surface of the rectangular-shaped baffle plate 74 by four air nozzles 78a-d each having a discharge outlet 80 oriented toward the bottom surface of the baffle plate 74. The air nozzles 78a-d are each externally threaded and are received within an internally threaded elbow 82. The nozzles 78a-d are each secured in position within the elbows 82 by a lock nut 83. Each threaded elbow 82 is connected to one of the feed pipes 84a-d extending from the outer wall 40 of lower housing 14 into the interior of the plenum 44. As viewed in FIG. 2, the four air nozzles 78a-d are spaced equidistant from the shaft 56 which extends through the center baffle plate 74, and are located on one of two diagonal lines 79a, b which extend between opposite corners of the baffle plate 74 and intersect at the center of shaft 56. See FIG. 2.

In order to obtain the desired, uniform flow of pressurized air toward the bottom of the baffle plate 74 and, in turn, immediately above the upper surface 66 of porous plate 18, two adjustment means are provided for the air nozzles 78a-d, i.e., a pneumatic adjustment and a mechanical adjustment. The pneumatic adjustment is shown in FIG. 2. Each of the feed pipes 84a-d connected to air nozzles 78a-d is also connected to a manifold 86 through a supply line 88. Separate air valves 90, such as suitable commercially available solenoid valves, are provided for each of the air nozzles 78a-d and are mounted in their respective supply lines 88. Flow of pressurized air is directed into each of the valves 90 from the manifold 86 which is connected to an air source 92, and the operation of such valves 90 is controlled by a suitable commercially available controller 94. In response to signals from the controller 94, the valves 90 are operative to control the air flow rate to each of the air nozzles 78a-d, and, in turn, to the baffle plate 74.

Mechanical adjustment of the air nozzles 78a-d is provided with the structure illustrated in FIG. 3. As mentioned above, each of the air nozzles 78a-d is connected to an internally threaded elbow 82 Vertical adjustment of the air nozzles 78a-d in the "Z" direction with respect to the bottom surface of baffle plate 74 is obtained by releasing lock nut 83 and rotating the externally threaded air nozzles 78a–d within each elbow 82 as desired. The selected positions of nozzle 78a–d are maintained by returning the lock nuts 83 into engagement with the elbow.

The position of air nozzles 78a–d is also laterally and angularly adjustable relative to the baffle plate 74 by structure provided at the outer wall 40 of the lower housing 14. As shown in solid lines in FIG. 3, each of the feed pipes 84a–d extends outwardly from the plenum 44 through an elongated opening 96 formed in the walls 40 of the lower housing 14. A mounting plate 98 formed with a slot 100 at each corner is connected to the wall 40 over each elongated opening 96. The mounting plates 98 are secured to the walls 40 by bolts 102 and nuts 104 at each corner slot 100, and a rubber gasket 106 is interposed between each mounting plate 98 and the wall 40 to form a seal therebetween. The outer end of each feed pipe 84a–d extends through an opening formed in each mounting plate 98, in alignment with the elongated opening 96 in the wall 40, and then into a sleeve 108 which is fixedly mounted to the plate 98 by welding or brazing. The sleeve 108 has an internal, sliding seal 110 which engages the feed pipes 84a–d to form a seal therebetween, and a set screw 112 which contacts the feed pipes 84a–d to secure them in a fixed position relative to the wall 40.

Adjustment of the position of each feed pipes 84a–d, and, in turn, the air nozzles 78a–d, is obtained as follows. Each feed pipe 84a–d and associated air nozzle 78a–d, respectively, is movable in an "X" direction as depicted in FIG. 3 by first loosening the set screw 112 and moving the feed pipe 84a–d axially along the sleeve 108 so that the nozzles 78a–d move toward and away from a wall 40. With the set screw 112 loosened, the feed pipes 84a–d can also be rotated within the sleeves 108 to adjust the angular position of nozzles 78a–d relative to the baffle plate 74 as shown by arrow 109 in FIG. 3. In order to obtain lateral adjustment of the feed pipes 84a–d in the "Y" direction as depicted in FIG. 3, perpendicular to the "X" direction, the nuts 104 at the corners of the mounting plate 98 are loosened thus allowing the mounting plate 98, sleeve 108 and feed pipes 84a–d to move laterally as a unit in the Y direction by virtue of the slot 96. This combination of four possible mechanical adjustments of the position of nozzles 78a–d, i.e., vertically in the "Z" direction, laterally along both the "X" and "Y" axes and angularly, aids in obtaining the desired air flow onto the bottom surface of the baffle plate 74.

In the embodiment of FIGS. 1–3, four air nozzles 78a–d are employed to provide the desired air flow to the baffle plate 74. It is contemplated that the number and arrangement of air nozzles 78a–d illustrated in FIGS. 2 and 3 would be useful for baffle plates 74 having width and length dimensions in which the ratio of the width-to-length does not exceed about 1½ to 1. In other words, as long as the width of the baffle plate 74 is not greater than about 1½ times the length thereof, the number and arrangement of air nozzles 78a–d illustrated in FIGS. 2 and 3 could be employed.

Figure 6:
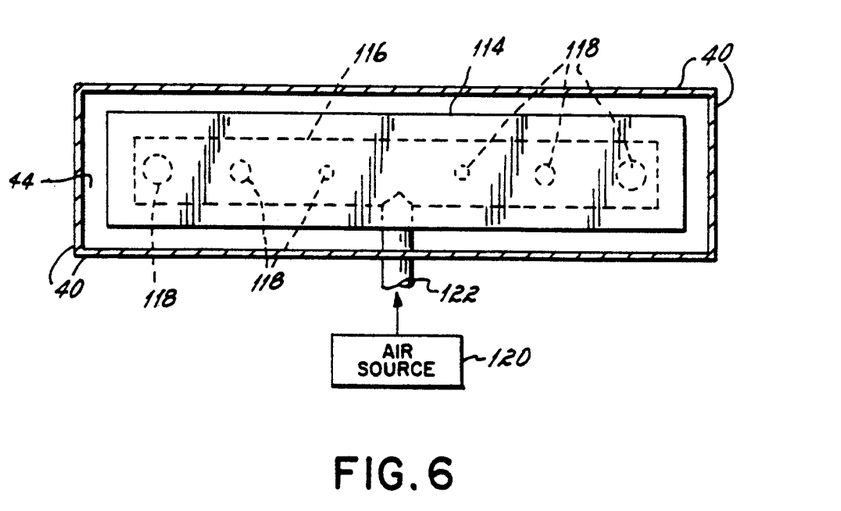
FIG. 6 is a cross sectional view similar to FIGS. 2 and 5 of an alternative embodiment of this invention.

It is contemplated, however, that where the width and length dimensions exceed a ratio of about 2 to 1, then the type of air nozzle configuration illustrated in FIG. 6 should be utilized. As shown in FIG. 6, a baffle plate 114 is provided having a much greater length than width, i.e., in excess of a 2 to 1 ratio. In this embodiment, a single feed pipe 116 is located within the plenum 44 which extends beneath the baffle plate 114 along its longitudinal axis. The feed pipe 116 is formed with a plurality of longitudinally spaced apertures 118 which progressively increase in diameter from the center of the baffle plate 114 and feed pipe 116 toward the outer edge thereof. In this embodiment, pressurized air from a source 120 is introduced into the feed pipe 116 through an inlet 122 located near the center thereof, and the air flows outwardly from the center to each of the apertures 118. The apertures 118 increase in diameter from the center of feed pipe 116, due to the pressure drop along the feed pipe 116, so that a relatively uniform air flow is obtained through each aperture 118.

The operation of the powder feed hopper 10 illustrated in FIGS. 1–3 is as follows. A cover 25 of the cap 24 is removed and a quantity of particulate powder material is loaded into the upper housing 12 atop the porous plate 18. Pressurized air from the air source 92 is then introduced into the plenum 44 through each of the air nozzles 78a–d. This flow of pressurized air moves upwardly toward the porous plate 18, and, in the course of such upward movement, is deflected outwardly by the baffle plate 74 through the gap 76 between the periphery of the baffle plate 74 and the outer walls 40 of lower housing 14. Some of this air flow passes directly upwardly from the gap 76 through the outer periphery of the porous plate 18, and the remainder of the air flow passes through the porous plate 18 from its outer periphery to the center thereof as illustrated by the arrows 124 in FIG. 1. This upward flow of pressurized air "fluidizes" the powder, i.e., entrains the powder in air to form the fluidized bed 22 above the porous, fluidizing plate 18.

The purpose of the baffle plate 74 is to create a velocity distribution of the pressurized air flowing through the porous plate 18, as schematically illustrated by the arrows 126 in FIG. 1. As represented by the length of the arrows 126 above the porous plate 18, the air flow rate and velocity of the fluidizing air passing through the porous plate 18 is greatest at its outer periphery and progressively decreases toward the center of the porous plate 18. A higher air flow rate and air velocity at the outer periphery of porous plate 18 compared to that toward the center thereof, creates different densities, i.e., powder-to-air ratios, along the porous plate 18. A lower density is obtained at the outer periphery of the porous plate 18 compared to the inner portion thereof, because of the higher air flow rate and consequent higher velocity thereat, and this difference in density produces a flow of powder from the center of the porous plate 18 toward the outer periphery thereof and toward the outer walls 20 of upper housing 12. The air-entrained particulate powder material flowing from the center of the porous plate 18 toward its outer periphery is carried upwardly along the walls 20 of upper housing 12 toward the cap 24. Near the top of the fluidized bed 22, the air-entrained particulate powder material falls back toward the center of porous plate 18 and most of the air escapes through the vent tube 37 at the top of the upper housing 12. A circulating flow illustrated by arrows 128 is thus created wherein the air-entrained particulate powder material moves upwardly along the walls 20 of upper housing 12, and then downwardly toward the center of upper housing 12 and porous plate 18.

The circulating flow of air-entrained particulate powder material within the fluidized bed 22 of upper housing 12 is advantageous in several respects. One advantage obtained is that the circulating flow of air-entrained particulate powder material helps to reduce the formation of channels of air along the upper surface 66 of porous plate 18. These concentrated areas or channels of air adversely affect fluidization of the powder material as described above. Another advantage of the circulating flow of air-entrained particulate powder material within the fluidized bed 22 is that stratification of powder particles is substantially reduced or eliminated. That is, a relatively uniform distribution of particles of all sizes is obtained within the entire height of fluidized bed 22, rather than a concentration of particles of different sizes at different areas within the fluidized bed 22.

A still further advantage of the circulating flow of air-entrained particulate powder material produced by baffle plate 74 is a reduction in air consumption, i.e., the air flow volume and air flow velocity of the fluidizing air entering plenum 44 can be reduced. In one experiment employing the powder feed hopper 10 herein, the air consumption was reduced by a factor of three while obtaining excellent fluidization of the particulate powder material. A reduction in air consumption reduces operational costs, and a reduction in air velocity reduces carry out of fines from the powder feed hopper 10 as described above.

In the embodiment of this invention illustrated in FIGS. 1–3, it has been found that a circulating flow of the air-entrained particulate powder material within the fluidized bed 22 is obtained where the distance 75 between the baffle plate 74 and the bottom surface 54 of porous plate 18 is in the range of about 10–15% of the width dimension of the rectangular-shaped porous plate 18, and wherein the gap or space 76 between the periphery of the baffle plate 74 and outer walls 40 of lower housing 14 is about 15% or less of the shorter of the length or width dimension of the porous plate 18.

EXAMPLE

For example, good results have been obtained with the powder feed hopper 10 herein having the following construction:

| porous plate 18: | length - 26 inches |
| | width - 18 inches |
| baffle plate 74: | length - 22 inches |
| | width - 14 inches |
| distance 75: | 2 inches |

As viewed in FIG. 2, the "length" dimension of both the porous plate 18 and baffle plate 74 is illustrated as a horizontal line and the "width" dimension is a vertical line.

In addition to the turbulence created by the baffle plate 74, operation of the air motor 68 to rotate the stirrer blades 64 also creates turbulence immediately above the upper surface 66 of porous plate 18. This turbulence assists in preventing the formation of channels of air atop the porous plate 18 for the purposes described above.

Figure 4:
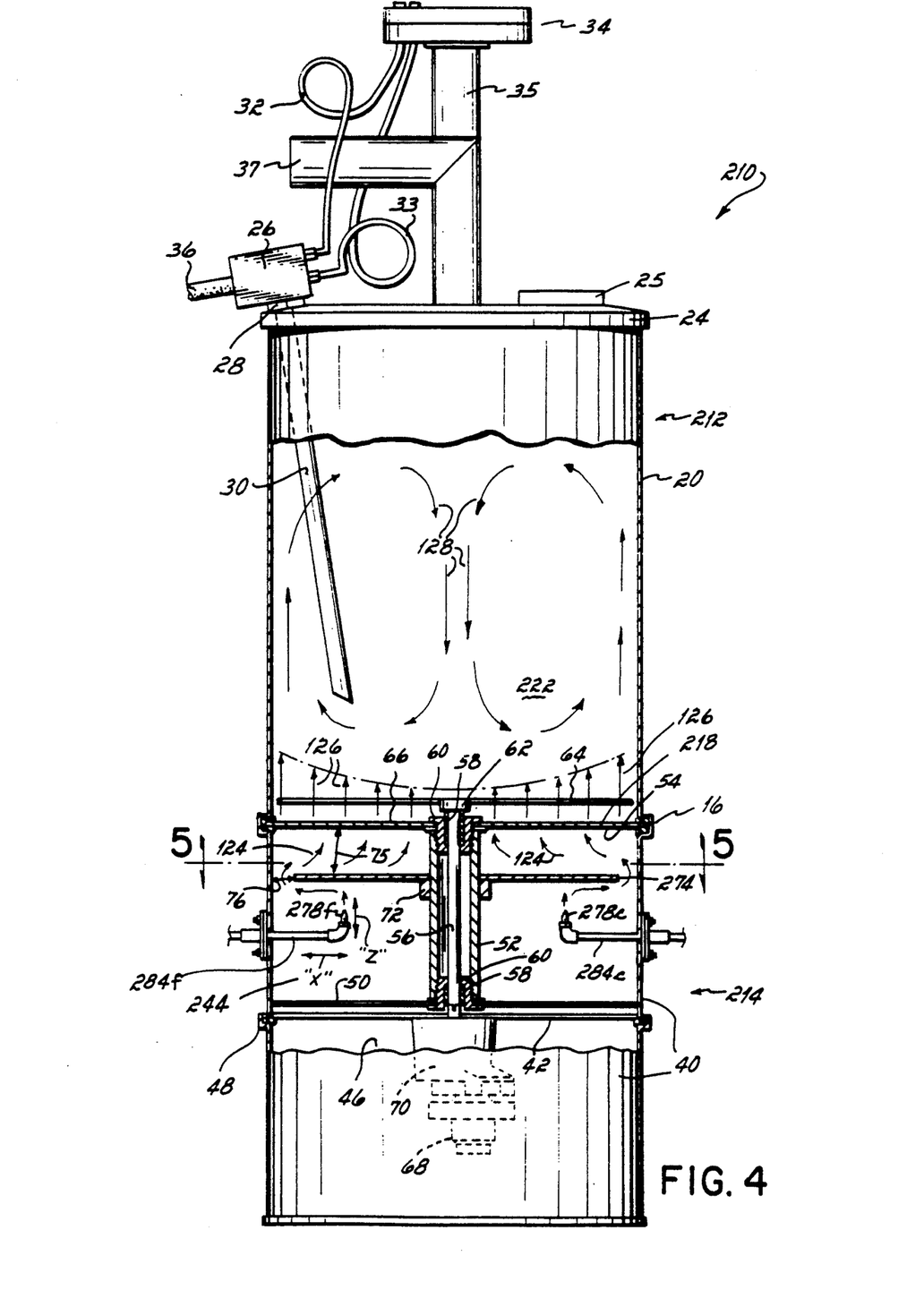
FIG. 4 is a view similar to FIG. 1 except having circular components instead of rectangular.
Figure 5:
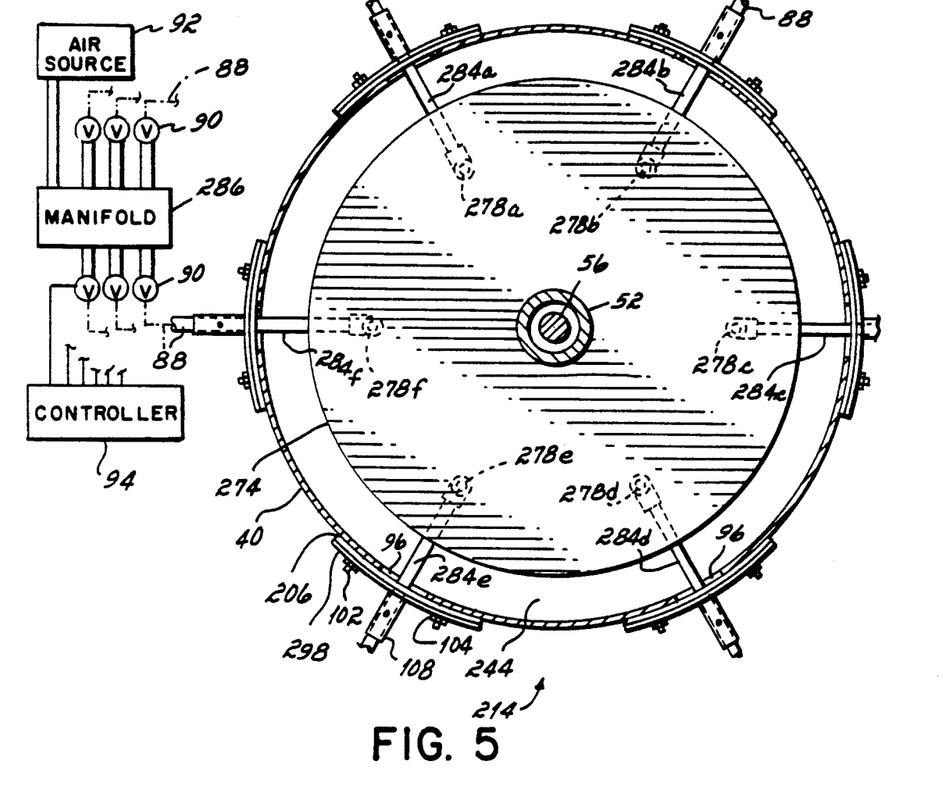
FIG. 5 is a cross sectional view taken generally along line 5—5 of FIG. 4.

Referring to FIGS. 4 and 5, an alternative embodiment of a powder feed hopper 210 is illustrated which is substantially similar in construction and operation to feed hopper 10 except the components of powder feed hopper 210 are circular in configuration. In this embodiment, the upper housing 212 and lower housing 214 are both cylindrical in shape, whereas the porous plate 218 and baffle plate 274 are circular in shape. Preferably, the distance 75 between the baffle plate 274 and the porous plate 218 is in the range of about 10–15% of the diameter of the circular porous plate 218, and the gap or space 76 between the periphery of the baffle plate 274 and the outer wall 40 of the lower housing 14 is about 15% or less than the diameter of the porous plate 218. Except as described below, all of the other components of powder feed hopper 210 are identical to those of powder feed hopper 10 and are given the same reference numerals as in FIG. 1.

With respect to the introduction of pressurized air into the plenum 44, the powder feed hopper 210 of this embodiment employs a somewhat different arrangement of air nozzles than in the embodiment of FIGS. 1–3. Referring to FIG. 5, the powder feed hopper 210 preferably includes six air nozzles 278a–f spaced approximately 60° apart and at the same radial distance with respect to the shaft housing 52. Each of the air nozzles 278a–f is connected by a feed pipe 284a–f, respectively, to a manifold 286 which is essentially identical to manifold 86. A separate air flow control valve 90 is mounted in each of the feed pipes 284a–f. The manifold 286 is connected to an air source 92 and a controller 94 which controls the operation of the valves 90, and thus the supply of pressurized air to air nozzles 278a–f, in the identical fashion described above in connection with the embodiment of FIGS. 1–3.

Structure for adjusting the vertical, lateral and angular position of each air nozzle 278a–f is employed in powder feed hopper 210 of the type shown in FIG. 3 and described above. As shown in phantom in FIG. 3, the same adjustment structure for nozzles 278a–f is employed as for nozzles 78a–d, except that each mounting plates 298 and rubber gasket 206 employed with the cylindrical-shaped lower housing 214 of powder feed hopper 210 is arcuate in shape instead of planar to conform to the cylindrical-shaped surface of the lower housing 214. Other than the differences in configuration of the powder feed hopper 210 and powder feed hopper 10 noted above, the two systems operate identically to one another and have the same advantages described above.

Referring now to FIGS. 7–10, alternative embodiments of this invention are illustrated which are similar in construction and operation to those described above except that the stirrer blades or paddles 64, and the associated structure for rotating such paddles 64, are eliminated. Structure in FIGS. 7–10 which is identical to that in the embodiments described above is repeated in FIGS. 7–10, and is not specifically discussed in the following description.

Figure 7:
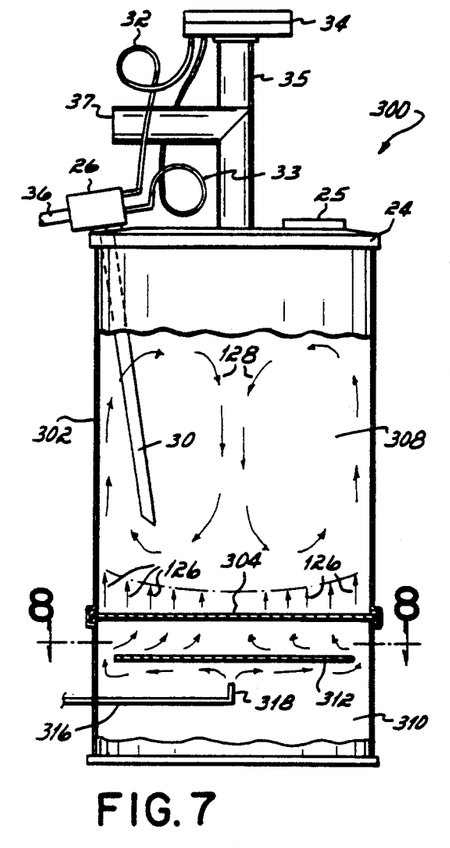
FIG. 7 is a cut-away, schematic elevational view of an alternative embodiment of this invention having circular components wherein the stirrer blade is eliminated and a single air nozzle is employed.
Figure 8:
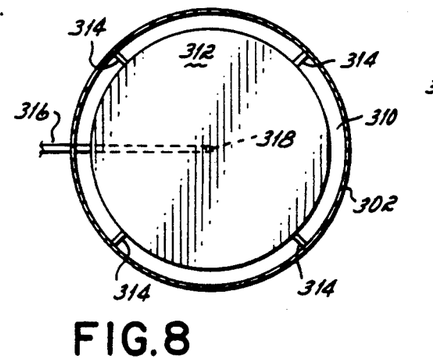
FIG. 8 is a cross sectional view taken generally along line 8—8 of FIG. 7.

Referring to FIGS. 7 and 8, a powder feed hopper 300 is illustrated which is similar to that disclosed in FIGS. 4 and 5 except for the elimination of the paddles 64 and the associated structure for rotating such paddles 64. The powder feed hopper 300 has a cylindrical-shaped wall 302 which mounts a circular porous plate 304. The porous plate 304 divides the powder feed hopper 300 into an upper fluidized bed 308 above the porous plate 304 and a lower, fluidizing air chamber or plenum 310 beneath the porous plate 304. A circular baffle plate 312 is mounted by brackets 314 to the hopper wall 302 beneath the porous plate 304. The spacing between the baffle plate 312 and porous plate 304, as well as the spacing between the periphery of the baffle plate 312 and the hopper wall 302, are identical to that described above in connection with FIGS. 4 and 5 and produce the same circulating flow of air-entrained powder material within the fluidized bed 309 as described above.

In the embodiment of FIGS. 7 and 8, an air feed pipe 316 mounts a single air nozzle 318 beneath and at approximately the center of baffle plate 312. Nozzle adjustment structure of the type illustrated in FIG. 3 is employed to vary the position of air nozzle 318 within the plenum 310 relative to the baffle plate 312.

Figure 9:
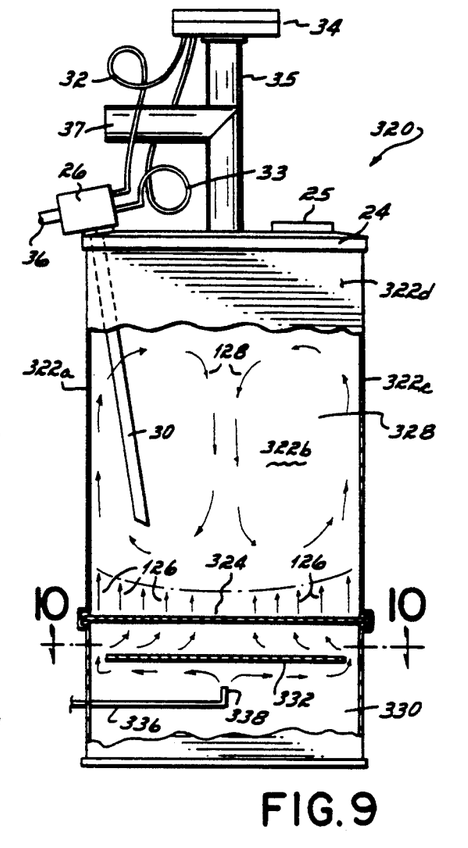
FIG. 9 is a cut-away, schematic elevational view of a still further alternative embodiment having rectangular components wherein the stirrer blade is eliminated and a single air nozzle is employed.
Figure 10:
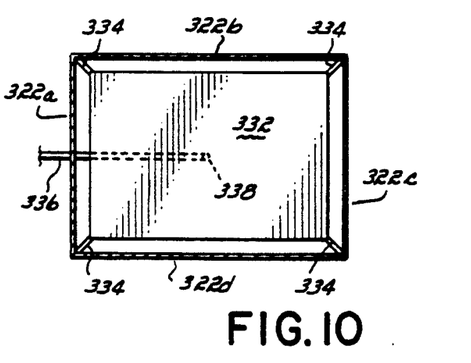
FIG. 10 is a cross sectional view taken generally along line 10—10 of FIG. 9.

Referring now to FIGS. 9 and 10, a powder feed hopper 320 is illustrated having rectangular components. The powder feed hopper 320 comprises four walls 322a–d which mount a rectangular-shaped porous plate 324 thus dividing the feed hopper 320 into a fluidized bed 328 above the porous plate 324 and a lower, fluidizing air chamber or plenum 330 beneath the porous plate 324. A rectangular-shaped baffle plate 332 is mounted by brackets 334 to the hopper walls 322a–d within the plenum 330. The distance between the baffle 332 and porous plate 324, and the distance between the periphery of the baffle plate 332 and hopper walls 322a–d, are identical to that discussed above in connection with the embodiment illustrated in FIGS. 1 and 2.

Preferably, an air feed pipe 336 mounts an air nozzle 338 within the plenum 330 in position beneath and at the center of the baffle plate 332. The air nozzle 338 directs an air flow upwardly toward the baffle plate 332 which is deflected before passing through the porous plate 324 in substantially the same manner, and for the same purposes, as described above in connection with FIGS. 1 and 2.

It is contemplated that the embodiments of this invention illustrated in FIGS. 7–10 would be employed in applications wherein a relatively small capacity powder feed hopper is required. In these applications, the physical dimensions of the powder feed hoppers 300 and 320 are small compared to those of the embodiments in FIGS. 1–6 and thus a single air nozzle 318, 338, respectively, can be employed to obtain the desired air flow past the baffle plates 312, 332 and then through the porous plates 304, 324.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, it is contemplated that for larger fluidized beds 22 the number of air nozzles 78a–d or 278a–f could be increased to obtain a more uniform distribution of air around the periphery of the baffle plates 74 or 274, respectively. Additionally, the space between the baffle plate and porous plate can be adjusted, and the relative size of baffle plate and the lower housing can be varied as desired to vary the velocity distribution of the air flow above the porous plates for different types of powder materials.

It is also contemplated that the baffle plates of any of the embodiments herein could be formed with holes or edge notches, with a different shape than the walls of the lower housing and/or in a curved or flat configuration. Such baffle plates could also be offset from the center of the plenum and/or the associated porous plates. Each of these alternative constructions of the baffle plates or positioning thereof within the plenum, can be utilized to vary the flow characteristics of the pressurized air directed toward the porous plates, as desired.

With reference to FIGS. 2 and 5, it is contemplated that the structure for supplying pressurized air to the nozzles 78a–d or 278a–e could be simplified, if desired. For example, in one preferred alternative embodiment the controller 94 is eliminated and a commercially available pressure regulator is interposed between the air source 92 and manifold 86 or 286. Additionally, the electrically operated solenoid valves 90 are replaced with manually operated and commercially available valves such as needle valves. In this embodiment, the pressure regulator ensures that the air supplied to each needle valve is the same, and the pressure of the air supplied to each nozzle 78a–d or 278a–e is controlled by manually setting the needle valves, as desired.

Therefore, it is intended that the invention not be limited to the particular embodiment disclosed as the best mode contemplated for carrying out this invention, but the invention will include all embodiments falling within the scope of the appended claims.

We claim:

1. A powder feed hopper, comprising:
    a housing having an outer wall which defines a hollow interior;
    a fluidizing plate mounted to said wall within said hollow interior of said housing, said fluidizing plate having a top surface adapted to support particulate powder material and a bottom surface, said fluidizing plate defining a fluidized bed within said housing above said top surface thereof and a plenum within said housing beneath said bottom surface thereof;
    means for introducing pressurized air into said plenum at a location beneath said bottom surface of said fluidizing plate, the pressurized air flowing upwardly toward said fluidizing plate;
    a baffle plate having an outer periphery, said baffle plate being mounted within said plenum in the path of said pressurized air flowing toward said fluidizing plate so that said baffle plate is spaced a predetermined distance from said bottom surface of said fluidizing plate and so that said outer periphery of said baffle plate is spaced a predetermined distance from said outer wall of said housing forming a space therebetween, said baffle plate being effective to direct said pressurized air introduced into said plenum through said space between said outer wall of said housing and said outer periphery of said baffle plate prior to passage of said pressurized air through said fluidizing plate.

2. The powder feed hopper of claim 1 in which said fluidizing plate has a width dimension and a length dimension, said baffle plate comprising a rectangular-shaped plate having width and length dimensions which are less than said width and length dimensions of said fluidizing plate.

3. The powder feed hopper of claim 2 in which said rectangular-shaped plate is located beneath said fluidizing plate at said predetermined distance which is equal to about 10% to 15% of said width dimension of said fluidizing plate.

4. The powder feed hopper of claim 2 in which said outer wall of said housing is rectangular in shape, said outer periphery of said rectangular-shaped plate being spaced at said predetermined distance from said outer wall of said housing which is equal to about 15% or less than the shortest of said width dimension and said length dimension of said fluidizing plate.

5. The powder feed hopper of claim 1 in which said fluidizing plate is annular in shape, said baffle plate comprising a circular baffle plate having a diameter less than the diameter of said fluidizing plate.

6. The powder feed hopper of claim 5 in Which said circular baffle plate is located beneath said fluidizing plate at said predetermined distance which is equal to about 10% to 15% of the diameter of said fluidizing plate.

7. The powder feed hopper of claim 5 in which said outer wall of said housing is cylindrical in shape, said outer periphery of said circular baffle plate being spaced at said predetermined distance from said outer wall of said housing which is equal to about 15% or less than said diameter of said fluidizing plate.

8. A powder feed hopper, comprising:
a housing having a wall which defines a hollow interior;
a fluidizing plate mounted to said wall within said hollow interior of said housing, said fluidizing plate having a top surface adapted to support particulate powder material and a bottom surface, said fluidizing plate defining a fluidized bed within said housing above said top surface thereof and a plenum within said housing beneath said bottom surface thereof;
means for introducing pressurized air into said plenum at a location beneath said bottom surface of said fluidizing plate, the pressurized air flowing upwardly toward said fluidizing plate;
a baffle plate having an outer periphery, said baffle plate being mounted within said plenum in the path of said pressurized air flowing toward said fluidizing plate so that said baffle plate is spaced a predetermined distance from said bottom surface of said fluidizing plate and so that said outer periphery of said baffle plate is spaced a predetermined distance from said outer wall of said housing forming a space therebetween, said baffle plate being effective to direct said pressurized air introduced into said plenum through said space between said outer wall of said housing and said outer periphery of said baffle plate prior to passage of said pressurized air through said fluidizing plate; and
stirrer means located above said top surface of said fluidizing plate for creating turbulence within the particulate powder material supported atop said fluidizing plate.

9. The powder feed hopper of claim 8 in which said stirrer means comprises:
a motor mounted within said housing below said bottom surface of said fluidizing plate;
a shaft drivingly connected to said motor and extending upwardly through said fluidizing plate;
at least one stirrer blade carried by said shaft in a position above said top surface of said fluidizing plate, said stirrer blade being rotatable with respect to said fluidizing plate in response to operation of said motor.

10. The powder feed hopper of claim 9 in which said housing includes a divider plate mounted to said wall thereof in a position below said plenum, said divider plate mounting said motor so that said motor is isolated from said plenum and from said fluidized bed.

11. A powder feed hopper, comprising:
a housing having an outer wall which defines a hollow interior;
a fluidizing plate mounted to said wall within said hollow interior of said housing, said fluidizing plate having a top surface adapted to support particulate powder material and a bottom surface, said fluidizing plate defining a fluidized bed within said housing above said top surface thereof and a plenum within said housing beneath said bottom surface thereof;
air supply means for supplying pressurized air;
nozzle means mounted within said plenum and connected to said air supply means for directing pressurized air toward said bottom surface of said fluidizing plate;
a baffle plate having an outer periphery, said baffle plate being mounted within said plenum in the path of said pressurized air directed by said nozzle means toward said fluidizing plate so that said baffle plate is spaced a predetermined distance from said bottom surface of said fluidizing plate and so that said outer periphery of said baffle plate is spaced a predetermined distance from said outer wall of said housing, said baffle plate being effective to direct said pressurized air introduced into said plenum through said space between said outer wall of said housing and said outer periphery of said baffle plate prior to passage of said pressurized air through said fluidizing plate, whereby a flow of pressurized air is created above said upper surface of said fluidizing plate in which the air velocity is greatest at said wall of the housing and substantially uniformly decreases toward the center of said fluidizing plate, said flow of pressurized air forming a circulating flow of air-entrained particulate powder material within said fluidized bed wherein the air-entrained particulate powder material circulates in a direction from said wall of said housing toward the center thereof.

12. The powder feed hopper of claim 11 in which said fluidizing plate and said baffle plate are each rectangular in shape, said nozzle means including four air nozzles located equidistant from the center of said baffle plate along lines extending diagonally between opposite corners of said rectangular baffle plate which intersect at the center of said rectangular baffle plate.

13. The powder feed hopper of claim 12 in which said nozzle means comprises a single air nozzle located at the center of said baffle plate.

14. The powder feed hopper of claim 12 in which said rectangular-shaped fluidizing plate and baffle plate each have width and length dimensions, said width and length dimensions of each said fluidizing plate and baffle plate having a ratio of not greater than about 1½ to 1.

15. The powder feed hopper of claim 12 in which said air supply means comprises:
a manifold adapted to be connected to a source of pressurized air;
an air valve connected to each of said air nozzles and communicating with said manifold to receive pressurized air therefrom;
a controller operatively connected to said air valves, said controller being effective to operate said air valves to control the air flow rate and air flow velocity of the pressurized air ejected from each of said air nozzles.

16. The powder feed hopper of claim 11 in which said nozzle means includes at least one nozzle for directing pressurized air toward said baffle plate and means for adjusting the position of said nozzle with respect to said baffle plate.

17. The powder feed hopper of claim 16 in which said adjustment means comprises:
   a feed pipe having a first end extending into said plenum beneath said baffle plate and a second end adapted to communicate with a source of pressurized air;
   said first end of said feed pipe being oriented perpendicularly relative to said baffle plate and being formed with threads;
   said nozzle being formed with threads engageable with said threads of said first end of said feed pipe so that said nozzle is movable along said first end of said feed pipe in a direction substantially perpendicular to said baffle plate.

18. The powder feed hopper of claim 16 in which said adjustment means comprises:
   a feed pipe extending through an opening formed in said wall of said housing, said feed pipe having a first end which mounts said nozzle within said plenum and a second end adapted to communicate with a source of pressurized air;
   a mounting plate connected to said wall of said housing over said opening therein, said mounting plate having a sleeve which slidably receives said feed pipe and locking means for releasably securing said feed pipe within said sleeve, said locking means being movable to an unlocked position to permit lateral movement of said feed pipe and said nozzle along the axis of said sleeve in a direction toward and away from said wall of said housing, and to permit rotational movement of said feed pipe within said sleeve so as to adjust the angular position of said nozzle relative to said baffle plate.

19. The powder feed hopper of claim 18 in which said wall of said housing is formed with an elongated slot which receives said feed pipe, said mounting plate being formed with an elongated slot at each corner, each of said elongated slots at the corners of said mounting plate receiving a bolt carried by said wall of said housing which is laterally movable therealong, whereby said mounting plate, said sleeve, said feed pipe and said nozzle are laterally movable as a unit in a direction substantially parallel to said wall of said housing.

20. The powder feed hopper of claim 18 in which said adjustment means includes a rubber gasket interposed between said mounting plate and said wall of said housing.

21. The powder feed hopper of claim 18 in which said adjustment means includes a sliding seal interposed between said sleeve and said feed pipe inserted within said sleeve.

22. The powder feed hopper of claim 11 in which said fluidizing plate and said baffle plate are each circular in shape, said nozzle means comprising six air nozzles spaced approximately 60° apart at the same radial distance from the center of said baffle plate.

23. The powder feed hopper of claim 22 in which said nozzle means comprises a single air nozzle located at the center of said baffle plate.

24. The powder feed hopper of claim 22 in which said circular baffle plate is located beneath said fluidizing plate at said predetermined distance which is equal to about 10% to 15% of the diameter of said fluidizing plate.

25. The powder feed hopper of claim 22 in which said outer wall of said housing is cylindrical in shape, said outer periphery of said annular baffle plate being spaced at said predetermined distance from said outer wall of said housing which is equal to about 15% or less than said diameter of said fluidizing plate.

26. The powder feed hopper of claim 22 in which said air supply means comprises:
   a manifold adapted to be connected to a source of pressurized air;
   an air valve connected to each of said air nozzles and communicating with said manifold to receive pressurized air therefrom;
   a controller operatively connected to said air valves, said controller being effective to operate said air valves to control the flow of pressurized air ejected from each of said air nozzles.

27. The method of forming a fluidized bed of air-entrained particulate powder material within the interior of a powder feed hopper having a substantially uniform density and even particle distribution, comprising:
   directing a stream of pressurized air toward the bottom surface of a fluidizing plate mounted within the interior of the powder feed hopper;
   deflecting said stream of pressurized air toward the wall of the powder feed hopper prior to contact with said fluidizing plate, said stream of pressurized air having a higher air flow volume and thus a higher velocity at the periphery of said fluidizing plate than toward the center portion thereof so as to form a fluidized bed above said fluidizing plate in which air-entrained powder material has a lower density at the periphery of said fluidizing plate and a higher density at the center portion thereof;
   creating a circulating flow of air-entrained particulate powder material within said fluidized bed above said fluidizing plate as a result of the difference in density of said air-entrained powder material at said periphery compared to said center of said fluidizing plate, wherein said air-entrained particulate powder material flows upwardly along said wall of said powder feed hopper and then downwardly along said center portion thereof within said fluidized bed.

28. The method of forming a fluidized bed of air-entrained particulate powder material within the interior of a powder feed hopper having a substantially uniform density and even particle distribution, comprising:
   directing a stream of pressurized air toward the bottom surface of a fluidizing plate mounted within the interior of the powder feed hopper;
   deflecting said stream of pressurized air toward the wall of the powder feed hopper prior to contact with said fluidizing plate, said stream of pressurized air having a higher air flow volume and thus a higher velocity at the periphery of said fluidizing plate than toward the center portion thereof so as to form a fluidized bed above said fluidizing plate in which air-entrained powder material has a lower density at said periphery of said fluidizing plate and a higher density at said center portion thereof;
   creating a circulating flow of air-entrained particulate powder material within said fluidized bed above said fluidizing plate as a result of the difference in density of said air-entrained powder material at said periphery compared to said center of said fluidizing plate, wherein said air-entrained particulate powder material flows upwardly along said wall of said powder feed hopper and then downwardly along said center portion thereof within said fluidized bed; and rotating at least one stirrer blade with respect to the top surface of said fluidizing plate to create turbulence thereat.

29. The method of forming a fluidized bed of air-entrained particulate powder material within the interior of a powder feed hopper having a substantially uniform density and even particle distribution, comprising:

introducing a stream of pressurized air into a plenum located within the interior of the powder feed hopper beneath a fluidizing plate therein;

directing said stream of pressurized air through a space formed between the outer periphery of a baffle plate located in said plenum and the wall of said plenum, said stream of pressurized air having a higher air flow volume and thus a higher velocity at the outer periphery of said fluidizing plate than at the center portion thereof so as to form a fluidized bed above said fluidizing plate in which air-entrained powder material has a lower density at the periphery of said fluidizing plate and a higher density at the center portion thereof;

creating a circulating flow of air-entrained particulate powder material within said fluidized bed above said fluidizing plate as a result of the difference in of said air-entrained powder material at said periphery compared to said center of said fluidizing plate wherein said air-entrained particulate powder material flows upwardly along said wall of said powder feed hopper and then downwardly along said center portion thereof within said fluidized bed.

* * * * *

UNITED STATES PATENT AND TRADEMARK OFFICE
CERTIFICATE OF CORRECTION

PATENT NO.  : 5,018,909
DATED       : May 28, 1991
INVENTOR(S) : Gerald W. Crum et al It is certified that error appears in the above-identified patent and that said Letters Patent is hereby corrected as shown below:

Column 5, line 28, "!2" should be --12--.

Column 6, line 66, after "elbow 82", please insert --at the inner end of feed pipes 84a-d, respectively.--.

Signed and Sealed this

Thirty-first Day of August, 1993

*Attest:*

BRUCE LEHMAN

*Attesting Officer*           *Commissioner of Patents and Trademarks*